Patent [19] … 3,791,523
Okumura et al. … Feb. 12, 1974

[54] SINTERED CHROMATOGRAPHIC PLATE AND METHOD FOR PRODUCING THE SAME

[75] Inventors: Tamotsu Okumura; Tetsuro Kadono, both of Osaka, Japan

[73] Assignee: Shionogi & Co., Ltd., Osaka, Japan

[22] Filed: Nov. 30, 1972

[21] Appl. No.: 310,686

[30] Foreign Application Priority Data
Dec. 17, 1971  Japan............................. 46-102940

[52] U.S. Cl............................................. 210/198 C
[51] Int. Cl............................................. B01d 15/08
[58] Field of Search... 210/31 C, 198 C, 302; 55/67, 55/197, 386

[56] References Cited
UNITED STATES PATENTS
3,418,152  12/1968  Staubenhanka et al........... 210/31 C
3,598,993  8/1971   Inoue et al....................... 210/31 C Primary Examiner—John Adee
Attorney, Agent, or Firm—Stewart & Kolasch, Ltd.

[57] ABSTRACT

A plate or thin-layer chromatographic element made by coating a refractory and chemically-stable support with a dispersion of fine particles of chromagtographically-active inorganic adsorbent, fine particles of a refractory and acid-resistant fluorescent pigment of red luminescence and powdered fluorescent glasses of blue and green luminescences in a liquid dispersing medium, the mixing ratio of said fluorescent glasses and fluorescent pigment is so determined that the obtained mixture may have a blend of the luminescences of the three fundamental colors, that is, a pure-white luminescence upon excitation by means of an ultraviolet irradiation, removing the dispersing medium, and heating the coated layer to make it adherent and thereby to form a continuous, coherent and porous sintered-layer. Particles of the powdered glass contained in said sintered-layer hold a uniform distribution of the adsorbent particles and fluorescent pigment particles, and form firm bondings between each other and with the surface of the support without any detriment to the activity of the spots The element enables the discrimination between two contiguous spots of a chromatogram of colorless compounds to be discriminated, each of which has at least one absorption band in the ultraviolet region and the corresponding quenched emission on the thin-layer capable of emitting a pure-white luminescence in the absence of the chromatogram.

14 Claims, No Drawings

SINTERED CHROMATOGRAPHIC PLATE AND METHOD FOR PRODUCING THE SAME

BACKGROUND OF THE INVENTION

1. Field of the Invention

The present invention relates to new elements for plate or thin-layer chromatography and methods of producing them: in one of its aspects, it relates to a highly coherent chromatographic layer having excellent porosity bonded to a support and an ability of emitting pure white luminescence upon an excitation by means of an ultraviolet irradiation of the continuous spectrum.

It can serve for the improvement in the art of chromatography by introducing such a durable and coherent layer of pure white luminescence enabling the development of chromatogram of the colorless sample of multicolored luminescent spots upon the ultraviolet irradiation, which facilitates the descrimination between two spots of the ingredients having approximately the same Rf values and obviates the need for a chromogenic determination which may, sometimes, be detrimental to the thin-layer including an organic binder or a fluorescent substance of poor acid resistance.

2. Description of Prior Art

Adsorbents for chromatographic use containing fluorescent materials are already known and some of them are commercially available: an example of such adsorbents is Silica Gel GF sold by Merck & Co. Ltd.. Those are primarily proposed to detect those materials which have no absorption band within the spectrum of visible light and therefore being intrinsically colorless but have at least one absorption band in the ultraviolet region. The chromatogram of the quenched emission obtained by employing such an adsorbent is monochromic because only one kind of fluorescent pigment is used and therefore its utility value in the qualitative analysis is insufficient.

In addition to this, chromatographic plates prepared by the conventional process with an adsorbent including a mixture of fluorescent pigments or such an adsorbent itself has been proposed. The mixing ratio of the pigments is adjusted such that the mixture can emit a white luminescence as a whole upon excitation of the ultraviolet irradiation and an example of such plates is already commercially available (Wakogel UA plate). See also, Tamura et al.: Quantitative analysis of ultraviolet absorbing compounds by means of mixed fluorescent pigments, Japan Analyst 19 518–524 (1970).

According to this paper and an investigation actually carried out on the commercially available plate, it is found that the ultraviolet absorbing materials developed on a chromatographic plates, the adsorbing layer of which contains such mixtures of the fluorescent pigments capable of emitting a white luminescence upon excitation by means of ultraviolet irradiation source of continuous spectrum, assume specific colors reflecting the corresponding quenched emissions due to the absorption bands of the materials to be detected, in spite of the fact that those materials being intrinsically colorless.

This procesure enables the qualitative detection of the colorless samples without chromogenic reaction and obviates the detrimental effect such as charring of the background associated with the reaction and the difficulty in ascertaining the colored images. The application of such mixed fluorescent pigments to the thin-layer chromatography is however automatically limited to some extent because the mixed fluorescent pigments inevitably include those which have poor chemical stability. Namely, a hot-spraying of concentrated sulfuric acid which is essential for the quantitative determination by means of densitometry or a soaking in bichromate-sulfuric acid which is required for the recovery or regeneration of the plates, may effect the deactivation of the fluorescent pigment which makes the re-use of the plates unable.

In addition to this, the actual investigation on the fluorescent adsorbent or the plates prepared with these adsorbent discloses that the quality of the white luminescence obtained by blending luminescences of the respective fundamental colors is still not satisfactory. This may be attributable to the fact that the scrutinization in the absorbing and emitting performance of each constituent pigments of the fluorescent mixture and in the ratio of mixing each ingredients, is still insufficient.

Although this defect may still remain open to discussion and may theoretically be improved, it imposes some restriction on the application of such adsorbent to the narrow scope together with the intrinsic mechanical fragility of the conventional thin-layer.

SUMMARY OF THE INVENTION

It is therefore the primary object of the present invention to provide plate or thin-layer chromatographic element, in the use of which the aforesaid various problems are extensively overcome, and which have the handling ease of a sheet of ordinary glass, metal or ceramic material, and an outstanding resistance to abrasion.

It is another object of the present invention to provide such thin-layer chromatographic plates which can be treated with a corrosive agent, being convenient for the qualitative or quantitative detection of colorless organic compounds without any loss in quality of the resultant record.

It is a further object of the present invention to provide such thin-layer chromatographic plates which can detect colorless sample without chromogenic reaction by the utilization of the absorbing bands of the compounds in the ultraviolet region and the corresponding quenched emissions of the thin-layer capable of emitting pure white luminescence in the absence of the chromatogram.

It is still another object of the present invention, to provide such thin-layer chromatographic plates which enable the discrimination between two contiguous spots of the compounds to be discriminated in a chromatogram, each having approximately the same Rf value, by the utilization of the different absorbing bands of the compounds and the corresponding quenched emissions of the thin-layer capable of emitting pure white luminescence in the absence of the chromatogram.

It is a still further object of the present invention to provide such thin-layer chromatographic plates which can withstand repeated uses and regeneration without any detriment to the chromatographic and handling properties.

It is still another object of the present invention to provide firmly bonded, uniform, highly adsorbent chromatographic layer of high porosity and good reproducibility for preparative-scale chromatographic separation.

It is a still further object of the present invention to provide a method of producing plate or thin-layer chromatographic elements, which method assures that the produced plate will demonstrate an excellent abrasion resistance and the thin adsorbent layer will retain its ability to adsorb materials to be chromatographed even after the repeated uses and regenerations.

It is still another object of the present invention to provide a method of preparing strongly coherent and highly porous chromatographic layers which can be firmly adherent to a permanent support.

These and other objects of the present invention and attendant advantages thereof will be apparent to those who are skilled in the art to which the present invention pertains by the following detailed disclosure in the specification and the appended claims.

DESCRIPTION OF THE PREFERRED EMBODIMENT

According to the preferred aspect of the present invention, there is provided a chromatographic element for use in plate or thin-layer chromatography, which comprises; a porous sintered layer of powdered glass formed on a surface of a support of refractory and chemically-stable material, wherein said powdered glass includes therein fluorescent glasses having properties of emitting green and blue luminescences, respectively, said sintered layer of glass particles contains distributed throughout the glass particles, a finely divided and chromatographically-active inorganic adsorbent and fine particles of a refractory and acid-resistant fluorescent pigment having a property of emitting red luminescence, the glass particles being firmly bonded to each other, to the adsorbent and fluorescent pigment particles and to the support, and the ratio of mixing said fluorescent glasses with fluorescent pigment is so determined that said sintered layer being capable of emitting a white luminescence as a whole upon an excitation by means of ultraviolet irradiation.

The present invention also provides a preparative method for the aforesaid chromatographic element which comprises; steps of mixing a finely particulate chromatographically-active inorganic adsorbent and fine particles of a refractory and acid-resistant fluorescent pigment with powdered glass containing fluorescent glasses in a mixing ratio whereby the obtained mixture has an ability of emitting a white luminescence as a whole upon an excitation by means of ultraviolet irradiation, kneading said mixture by adding a small amount of volatile solvent to obtain a slurry, applying said kneaded slurry-like mixture on and spreading over the surface of a refractory and chemically-stable support, and then baking the applied support at a temperature sufficient for melting the surface of the powdered glass to stick to each other, and to the support until the powdered glass become bonded to each other and to the support.

As can be appreciated, the present invention is partially based on the art concerning the chromatographic plate, disclosed by the present inventors in U.S. Pat. No. 3,677,410. Namely, it utilizes the sintered layer of finely powdered or divided glass on the support of refractory and chemically-stable material, for example, glass, metals or ceramic materials, as a means for holding or embracing the particles of adsorbent. In this manner, the present inventors have avoided the use of undesirable binders and succeeded in the provision of the chromatographic plates of excellent durability and of high resistance to corrosive reagent. In addition to this, they have found that the sintered layer can be utilized as a luminescent layer by introducing one or more of fluorescent glasses into the layer.

As the glass materials which constitute the sintered layer of the present invention, use is made of, for instance, lead-silicate glass which emits blue luminescence and uranium glass which emits green luminescence upon excitation of a ultraviolet irradiation. Furthermore, a vanadate or an oxide of Yytrium or Gadolinium activated with Europium is an example of the red luminescence emitting fluorescent pigment, which red luminescence is complementary to the above blue and green luminescences such that the blend of the luminescences of the three fundamental colors exhibits a white luminescence as a whole.

The reason for allotting the blue and green luminescences to the fluorescent glasses and the red luminescence to the fluorescent pigment is that no red luminescence emitting fluorescent glass has a sufficient emitting ability while a red luminescence emitting fluorescent pigment shows a sufficient resistance to acids.

The luminescence of fluorescent glass is based on the mechanism of an ionic emission whereas that of fluorescent pigment is based on that of an electronic emission. Although the sintered layer of the present invention has a hybrid structure and its luminescence is based on a hybrid mechanism, it has an ability of emitting a good blend of the luminescences of fundamental colors, each colored luminescences complementing one another quite satisfactorily to produce a pure white luminescence, and assumes a brilliant color which corresponds to the quenched emission when a ultraviolet absorbing material is present.

The support can be made of any refractory and chemically-stable material; of glass, metals or ceramic materials, and is formed into a plate, usually a rectangular strip. Although stainless steel, titanium and the like are suitable examples of the chemically-stable metals, other metals such as iron, copper, brass and aluminum may also be used, with some restriction imposed by their chemical reactivity with the materials to be chromatographed or with the developing solvent used. Metals coated with glass or the like materials are also preferred support materials.

Any powdered adsorbent e.g., silica gel, alumina, diatomaceous earth, magnesium silicate and porous high silicate glass powder can be used as the chromatographically-active inorganic adsorbent. Particle size of these inorganic adsorbents is usually selected as that most suitable for the intended use. Most of the commercially available adsorbents for thin-layer chromatography are advantageously used without substantial modification.

According to the method of the present invention, the above fluorescent glasses are crushed in a conventional ball-mill, elutriated and sieved to obtain even granules which have slighly smaller particles size than that of the adsorbent, namely granules having particle size diameters of from about 1 $\mu$ to about 40 $\mu$, and the obtained granules are selected by their particle sizes to meet the intended purpose of the use.

The mixing ratio of one of the fluorescent glass powder to the other as well as the mixing ratio of the sum of the powdered fluorescent glasses to the fluorescent pigment cannot generally be determined in fixed numerals, and is selected such that the obtained mixture and therefore the sintered-body of the mixture may have an ability of emitting a pure white luminescence as a whole upon excitation by means of an ultraviolet irradiation source of continuous spectrum.

The mixing ratio can however be exemplified in one specific composition consisting uranium glass (containing about 2 percent of $U_3O_8$) of green luminescence, lead-silicate glass (containing about 23 percent of PbO) of blue luminescence and Europium activated Yytrium vanadate ($YVO_4$/Eu, Toshiba: SPD-373 B) of red luminescence, as about 50-70 percent, about 9-15 percent and about 1-5 percent, respectively. The silica gel adsorbent (Merck: Silica gel H) is incorporated into this composition in a mixing ratio of between about 20 percent and about 25 percent. (All percent are expressed in weight by weight).

In another specific composition including alumina as the adsorbent, there is incorporated between about 45 percent and about 55 percent of uranium glass, between about 9 percent and about 12 percent of lead-silicate glass, between about 1 percent and about 5 percent of $YVO_4$/Eu and between about 30 and about 35 percent of Merck: Aluminium oxide neutral Type T.

As previously described, it is extremely difficult to numerically determine the mixing ratio of one fluorescent glass to the other and that of the fluorescent glass to the fluorescent pigment. The mixing ratio should be corrected or adjusted in accordance with the specified lot or even with the every crucibles, because two pots (crucibles) of glass of the same composition may have the different spectra and/or intensities of the luminescence and the corrected value should be observed very critically.

On the other hand, the mixing ratio of the sum of the fluorescent glasses and the fluorescent pigment to the adsorbent is not so critical and may be selected arbitrary out of relatively wide range. The ratio (in weight by weight) generally ranges from about 1:1 up to about 30:1, preferably from about 2:1 up to about 4:1. Where the ratio of the adsorbent to said sum of the glasses and pigment is greater than 1, the binding force of glass particles in the layer is insufficient and the intensity of the luminescence is also adversely affected. A ratio smaller than 1:30 is not suitable because it leads to incomplete development. Typically, a weight of the adsorbent about 20 percent to about 50 percent of the whole mixture produces advantageous results, although other ranges may be useful for particular combination of an adsorbent and eluting solvent.

There is a general tendency that the greater the ratio of the powdered glass to adsorbent, the higher the Rf value of the chromatogram developed with a given solvent, the said Rf value being adjustable by lowering the polarity of said developing solvent. Therefore, separation of highly polar materials, which have hitherto been known to be very difficult in chromatography, can be effected on a plate of this invention, the activity of whose adsorbent is adjusted by varying the aforesaid ratio.

According to the present invention, said mixture of the powdered fluorescent glasses, the fluorescent pigment and the adsorbent is kneaded after adding a small amount of slurrying agent thereto, which agent is preferably a volatile solvent including water, alcohols, benzene, ketones or any mixture thereof.

The slurrying agent serves for the homogenization of the mixture and give the slurry a suitable consistency and an adhering property to the support. The desired property of the slurrying agent is to hold the shape of the thin-layer undisturbed until the baking operation; acetone and ethanol are particularly suited for this purpose.

Other auxiliary binding agents may optionally be added to said mixture so long as they can be completely removed by, for example, vaporization or incineration and they do not produce any residue after baking. Canada balsam and esters of cellulose, having a strong adhering property, can advantageously be added to said mixture, because they fulfill said various requirement and because benzene and ketones used as their solvent have good volatility.

The slurry or paste-like mixture thus formed is applied on or spread over the support with a conventional applicator. The thickness of the applied layer is adjusted so that the layer may have the thickness of from about 150 $\mu$ to about 2 mm after being baked and sintered. The latter rather thick layer of 2 mm is suitable for use in the plate chromatography.

The layer having been applied and dried, is baked preferably in a clean environment, for instance, in an electric furnace, at a temperature sufficiently high for melting the surfaces of the glass particles to enable them stick to each other and to the support, during a time period sufficient for effecting an adhesion between or among the glass particles and between the particles and the surface of the support. In most instances, the baking is performed at about 650°-700°C for about 3-20 minutes.

Since glasses including lead-oxide have lower softening points and melting points as compared with the conventional soda-lime glass, care must be taken not to melt the glass excessively to conceal or confine the adsorbent particles. Of course, if the baking is insufficiently performed either in time or in temperature, no sintered layer is formed.

After baking, the plates are gradually cooled to remove the danger of strain caused by the heating and developed among the component particles and between the particles and the support. This is important for the plates for the thin-layer chromatographic use whose flatness is essential. Regardless of the fact that there is a great difference between the thermal expansion coefficient of fluorescent glasses and that of the adsorbent (for instance, the expansion coefficient of uranium glass is about $9 \times 10^{-6}$, while that of silica gel is about $5.4 \times 10^{-7}$), the particles to give the sintered layer form firm and mutually melted bondings. It is further surprizing that the firmness of the bondings between the glass particles and the support materials other than glass, for instance, metal is far better than was anticipated.

This phenomenon is most unexpected and is believed to result from the fact that the sintered-layer of the fine particles of glass which covers the surface of the support plate has sponge-like spaces of conticuous cavities and channels, and the adsorbent particles are held or embraced within said spaces without being densely packed together and play a role of a kind of buffer having a shock-absorbing action.

This hypothesis can be supported by the fact that only hardly appreciable differences is ascertained between the chromatographic activities of the adsorbent before and after the baking operation. The adsorbent particles are not embeded or confined in the sintered-layer of the glass particles but at least partially exposed over the surface of the layer.

For the silica gel adsorbent, it is confirmed that the property as the adsorbent is not deteriorated by heating at the temperature where the fluorescent glass begins to melt or softened (about 650°C, for one of such glasses having a comparatively high softening point) for about 7 minutes from the following fact.

1. No difference is appreciated in the specific surface area and the particle size distribution of the silica gel before and after the heating.

2. No defect is observed in the chromatogram developed on a plate for thin-layer chromatography prepared by conventional process and employing the silica gel treated with this heating operation.

3. Porous structure of the adsorbent is still observed in scanning electronic micrograph of the sample sintered plate though the edges of the glass particles are rounded.

In the following paragraphs, the advantageous features of the present invention will be illustrated in detail referring to a preferred embodiment.

EXAMPLE

A. Preparation of Powdered Glasses:

The commercially available uranium glass and lead-silicate glass of the following particulars are employed as the glasses having green and blue luminescences, respectively.

i. Uranium glass
Ingredients:
 $SiO_2$ — 60.5 weight percent
 $B_2O_3$ — 12.7 weight percent
 $Al_2O_3$ — 3.18 weight percent
 $Na_2O$ — 16.6 weight percent
 $K_2O$ — 0.4 weight percent
 $PbO$ — 0.8 weight percent
 $U_3O_8$ — 1.97 weight percent
 $CaO$ — 2.38 weight percent
 $MgO$ — 1.59 weight percent
Softening point: about 650°C
Thermal expansion coefficient: about $90 \times 10^{-7}$
Maximum emission: at 382 m$\mu$/ Excitation at 280 m$\mu$
ii. Lead-silicate glass
Ingredients:
 $SiO_2$ — 62.4 weight percent
 $PbO$ — 22.3 weight percent
 $Al_2O_3$ — 0.34 weight percent
 $Na_2O$ — 15.35 weight percent
Softening point: about 453°C
Thermal expansion coefficient: about $90.3 \times 10^{-7}$
Maximum emission: at 518 m$\mu$/ Excitation at 328 m$\mu$ The both glass materials are separately crushed in a ball-mill, elutriated and sieved to obtain finely granulated glass powders having a particle size distribution: 1-2 $\mu$ (13-16 percent), 2-3 $\mu$ (21-25 percent) and 3-4 $\mu$ (16-20 percent) and a specific surface area of 3.3-3.5 m$^2$/g.

In this connection, reference is made to the adsorbents which have a particle size distribution of about 10-40 $\mu$ and a specific surface area of about 400-600 m$^2$/g (in the cases of silica gel and alumina).

B. Preparation of the Plates for chromatography:

The finely powdered glasses obtained in (A) are mixed with an adsorbent and a fluorescent pigment powder in the following mixing ratios.

i. Mixture for the silica gel plate:
Merck: Silica Gel H — 1g (20 weight percent)
Uranium glass powder — 3.28g (65.6 weight percent)
Lead-silicate glass powder — 0.6g (12.0 weight percent)
$YVO_4$/Eu (Toshiba: SPD-373 B) —0.12g (2.4 weight percent)
ii. Mixture for the alumina plate:
Merck: Aluminium Oxide neutral Type T — 6 g (33 weight percent)
Uranium glass powder — 9.84 g (55 weight percent)
Lead-silicate glass powder —1.8 g (10 weight percent)
$YVO_4$/Eu (Toshiba: SPD-373 B) —0.36 g (2 weight percent)

The obtained mixture is kneaded with a small amount of acetone to obtain a slurry which is thereafter applied on and spread over a supporting plate (glass, metals or ceramic materials) as a thin-layer of about 250-300 $\mu$ thickness.

After the acetone as the slurrying agent is removed by aeration, the applied plate is baked until the glass become softened (half-molten) in an electric furnace at about 650°C for about 6 minutes. The thickness of the sintered layer after the baking operation, is about 180-220 $\mu$.

C. Control plates:

1. Conventionally processed laboratory made plate; obtained by employing Merck: Silica Gel G containing as its ingredient, 10 percent of a mixed fluorescent pigment (Toshiba: SPD-254).

ii. Precoated plate; Wakogel UA, containing a mixed white fluorescent pigment and available from Wako Chemical Co. Ltd., Osaka, Japan.

iii. Conventionally processed laboratory made plate; obtained by employing Merck: Aluminium Oxide neutral Type T containing as its ingredient, 5 percent of gypsum and 10 percent of a mixed fluorescent pigment (Toshiba: SPD-254).

D. Modified irradiation source:

A low-pressure mercury lump with a reflector plate, modified by inserting a fluorescent membrane of ultraviolet irradiation between the lump and the reflector and mounting an ultraviolet filter (Toshiba: UV-D 25) at the front of the lump as described in Japan Analyst 19 518-519 (1970). This irradiation source is capable of emitting a continuous radiation over the whole spectrum of the ultraviolet region.

E. Results of Developing and Separating Tests:

In order to examine the separating ability of the obtained plates and to prove the performance of the detection by means of the modified irradiation source, a series of developing tests is carried out using a mixture of water soluble vitamines and mixed alkaloids as reference materials to be chromatographed.

Results of the tests as compared with those of the control experiments on the control plates are summerized in the following tables.

i. Experimental results on the plates containing silica gel.
Plates employed:

a. Plate of the sintered-layer formed on soda-lime glass by the process of (B) (i).
b. Plate defined in (C) (i).
c. Plate defined in (C) (ii).

Conditions for the ascending development:
Temperature: 20°C (room temperature)
Solvent: Acetone-water (10:1, v/v)
Distance: 15 cm
Time: (a) 46 minutes, (b) 42 minutes, (c) 65 minutes
Origin: 2 cm from the bottom edge.

TABLE 1

(hRf values* and Hues** of mixed vitamines)

| Ingredients | Plate: (a) | (b) | (c) |
|---|---|---|---|
| | (each 30 μg) | | |
| Vitamine $B_1$ | 20 violet | 4 violet | 5 violet |
| ( " as hydrochloride) | (4) | (2) | (2) |
| Vitamine $B_2$ | 47 yellow | 48 yellow | 55 yellow |
| Vitamine $B_6$ | 67 violet | 59 violet | 64 violet |
| Niacin | 11 reddish violet | 19 violet | 21 violet |
| Niacinamide | 72 reddish violet | 59 violet | 65 violet |
| Vitamine C (ascorbic acid) | 7 violet | 31 violet | 17 violet |
| Vitamine $B_{12}$ | 1 red | 1 violet | 2 violet |
| Background of the chromatogram | pure white | pale white | purplish white |

*Hundredth of Rf value
**When irradiated by the modified irradiation source

As can be seen from the above table, plate (a) prepared in accordance with the present invention exhibits clearer and more distinctive colored spots of the chromatogram of the four vitamins of niacin et.seq. as compared with plates (b) and (c) because the background of the chromatogram of the plate (a) is pure white whereas those of plates (b) and (c) are pale white and purplish white, respectively.

Particularly, the discrimination of the vitamine $B_6$ with respect to the niacinamide, Rf values of which closely approximate with each other, is facilitated.

ii. Experimental results on the plates containing alumina.

Plates, employed:
d. Plate of the sintered-layer formed on soda-lime glass by the Process of (B) (ii).
e. Plate defined in (C) (iii) above.

Conditions for the ascending development:
Temperature: 20°C (room temperature)
Solvent: benzene-chloroform-diethylamine (9:2:0.25, v/v)
Distance: 10 cm
Time: (d) 18 minutes, (e) 15 minutes
Origin: 2 cm from the bottom edge

TABLE 2

(hRf values and Hues of the mixed alkaloids (each 20 μg))

| Ingredients | Plates: (d) | (e) |
|---|---|---|
| Caffeine | 47 reddish violet | 29 reddish violet |
| Reserpine | 28 bluish violet | 20 bluish violet |
| Brucine | 46 bluish violet | 26 bluish violet |
| Strychinine | 60 reddish violet | 36 reddish violet |

The sintered plates having the sintered layer formed on the soda-lime glass are exclusively used in the above tests, though approximately the same adhering property and separating ability are also obtained with plates having the sintered layer formed on metals (titanium and stainless steel) and on a ceramic material (steatite).

Of the plates used for the above developing and separating tests, plates (b), (c) and (e) show poor resistivity against acid, and are not suitable for the regeneration for repeated uses. The plates (a) and (d) retain their pure white luminescence even after the regeneration process including soaking in a cleaning solution of bichromate-sulfuric acid, followed by washing and rinsing with distilled water, and activation treatment at 110°C for 1 hour for the subsequent development of chromatogram, and are capable of separating and identifying the water soluble vitamines, alkaloids and the like.

The invention being thus described, it will be obvious that the same may be varied in many ways. Such variations are not to be regarded as a departure from the spirit and scope of the invention, and all such modifications are intended to be included within the scope of the following claims.

We claim:

1. A chromatographic element for use in plate or thin-layer chromatography, which comprises a porous sintered-layer of powdered glass formed on a surface of a support of refractory and chemically-stable material, wherein said powdered glass includes therein fluorescent glasses having properties of emitting green and blue luminescence, respectively, said sintered layer of glass particles contains distributed throughout the glass particles, a finely-divided and chromatographically-active inorganic adsorbent and fine particles of a refractory and acid-resistant fluorescent pigment having a property of emitting red luminescence, the glass particles being firmly bonded to each other, to the adsorbent and fluorescent pigment particles and to the support, and the ratio of mixing said fluorescent glasses with fluorescent pigment is so determined that said sintered layer being capable of emitting a white luminescence as a whole upon an excitation by means of ultraviolet irradiation.

2. A chromatographic element as claimed in claim 1, wherein said powdered glass contains uranium glass having green luminescent property.

3. A chromatographic element as claimed in claim 2, wherein between about 45 and about 70 weight percent of said uranium glass is incorporated in the sintered-layer.

4. A chromatographic element as claimed in claim 1, wherein said powdered glass contains lead-silicate glass having blue luminescent property.

5. A chromatographic element as claimed in claim 4, wherein between about 9 and about 15 weight percent of said lead-silicate glass is incorporated in the sintered-layer.

6. A chromatographic element as claimed in claim 1, wherein said refractory and acid-resistant fluorescent pigment of red luminescent property is selected from the group consisting of Yytrium vanadate, Gadolinium vanadate, Yytrium oxide and Gadolinium oxide.

7. A chromatographic element as claimed in claim 6, wherein between about 1 and about 5 weight percent of said fluorescent glass of red luminescence is incorporated in the sintered-layer.

8. A chromatographic element as claimed in claim 1, wherein said chromatographically-active inorganic adsorbent is selected from the group consisting of silica gel, alumina, diatomaceous earth, magnesium silicate, and porous high silicate glass powder.

9. A chromatographic element as claimed in claim 1, wherein said support material is glass.

10. A chromatographic element as claimed in claim 1, wherein said support material is metals.

11. A chromatographic element as claimed in claim 1, wherein said support material is ceramic materials.

12. A chromatographic element as claimed in claim 1, wherein the ratio of the sum of the powdered glasses and the fluorescent pigment to the adsorbent is between about 1:1 and about 30:1 by weight.

13. A chromatographic element as claimed in claim 1, wherein the ratio of the sum of the powdered glasses and the fluorescent pigment to the adsorbent is between about 2:1 and about 4:1 by weight.

14. A chromatographic element as claimed in claim 1, wherein the sintered-layer has a thickness of from about 150 $\mu$ to about 2 mm.

* * * * *